United States Patent [19]
Dawson

[11] Patent Number: 5,778,483
[45] Date of Patent: Jul. 14, 1998

[54] WINDSHIELD WIPER BLADE ASSEMBLY WITH SPONGE AND TENSION MECHANISM

[76] Inventor: Steven K. Dawson, 901 Princeton Ave. #211, Palmerton, Pa. 18071

[21] Appl. No.: 799,376

[22] Filed: Feb. 14, 1997

[51] Int. Cl.$^6$ ............................... B60S 1/46; B60S 1/38; B60S 1/28
[52] U.S. Cl. .................. 15/250.04; 15/250.41; 15/250.4; 15/250.202; 15/250.48
[58] Field of Search .................. 15/250.4, 250.41, 15/250.48, 103, 250.11, 250.03, 250.361, 244.1, 245, 250.202

[56] References Cited

U.S. PATENT DOCUMENTS

| | | | |
|---|---|---|---|
| 1,487,344 | 3/1924 | Lukens | 15/250.41 |
| 3,631,561 | 1/1972 | Aszkenas | 15/250.41 |
| 4,327,457 | 5/1982 | Lunsford | 15/250.41 |
| 4,567,621 | 2/1986 | Alley, Jr. | 15/250.41 |
| 4,649,593 | 3/1987 | Gilliam, III et al. | 15/250.41 |
| 4,745,653 | 5/1988 | Bliznak | 15/250.41 |
| 4,754,517 | 7/1988 | Aldous | 15/250.4 |

FOREIGN PATENT DOCUMENTS

| | | | |
|---|---|---|---|
| 2700527 | 9/1978 | Germany | 15/250.41 |
| 3611098 | 9/1986 | Germany | 15/250.4 |
| 1419345 | 12/1975 | United Kingdom | 15/250.41 |
| 2038169 | 7/1980 | United Kingdom | 15/250.41 |

*Primary Examiner*—Gary K. Graham

[57] ABSTRACT

A new windshield wiper blade assembly with sponge and tension mechanism for removing stubborn insect deposits and other debris from the exterior of a front windshield of a vehicle. The inventive device includes a wiper blade support assembly having a plurality of wiper fluid spray holes and is attached to the oscillating wiper arm of a vehicle. A first wiper blade and a second wiper blade are spaced apart from one another and downwardly depend from the wiper blade support assembly. A scrubbing sponge having a scrubbing surface and a plurality of wiper fluid channels is interposed between the first wiper blade and the second wiper blade. A plurality of wiper fluid hoses in fluid communication with the wiper fluid channels and the wiper fluid spray holes allows wiper fluid to be dispensed to the scrubbing sponge and the windshield. A sponge tension mechanism is mounted to the wiper blade support assembly and applies pressure to the scrubbing sponge to firmly position the scrubbing sponge against the windshield.

8 Claims, 3 Drawing Sheets

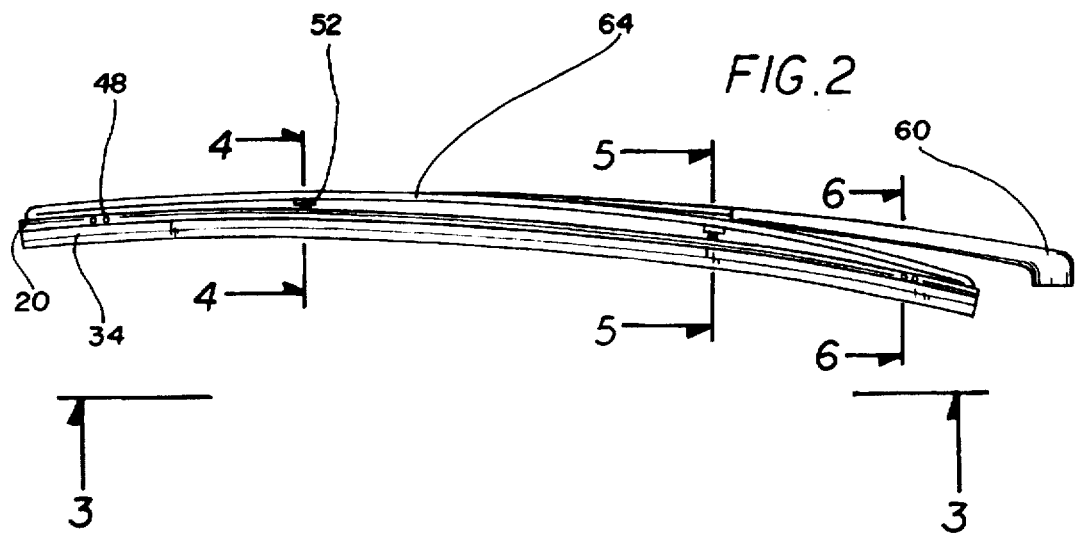
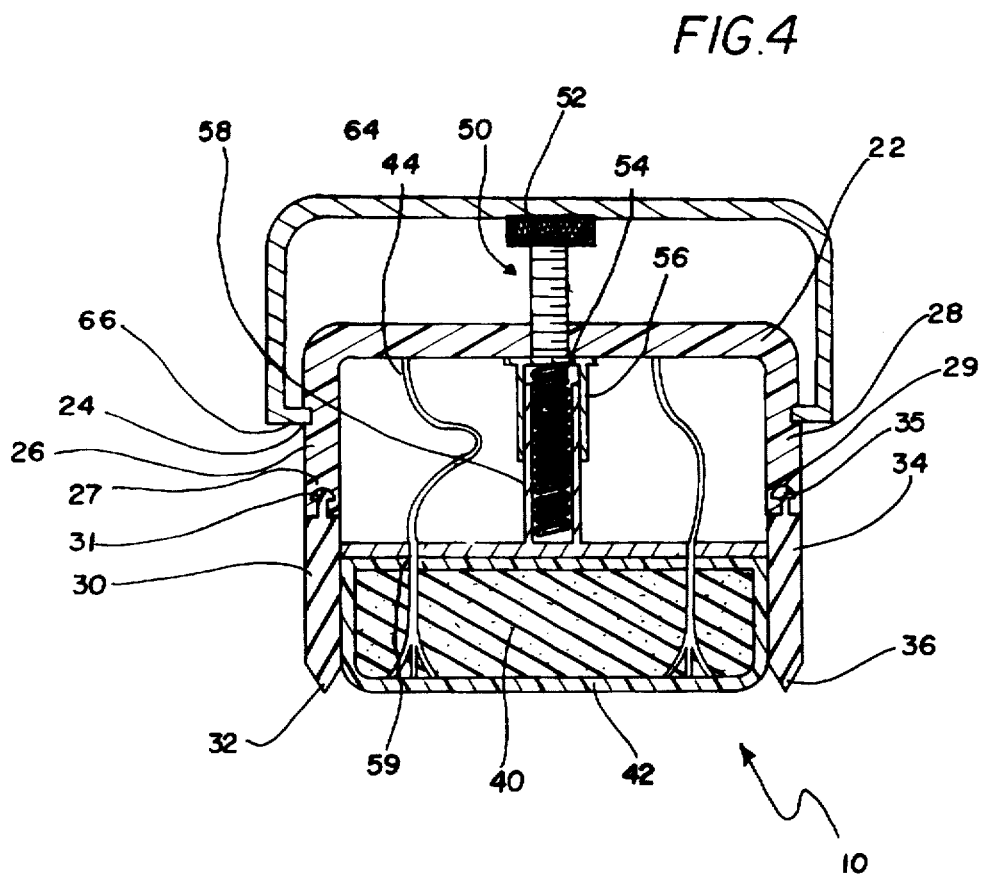

5,778,483

WINDSHIELD WIPER BLADE ASSEMBLY WITH SPONGE AND TENSION MECHANISM

BACKGROUND OF THE INVENTION

1. Field of the Invention

The present invention relates to windshield wiper blade systems and more particularly pertains to a new windshield wiper blade assembly with sponge and tension mechanism, for removing stubborn insect deposits and other debris from the exterior of a front windshield of a vehicle.

2. Description of the Prior Art

The use of windshield wiper blade systems is known in the prior art. More specifically, windshield wiper blade systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art windshield wiper blade systems include U.S. Pat. No. 4,567,621; U.S. Pat. No. 5,406,672; U.S. Pat. No. 5,442,834; U.S. Pat. No. 5,301,384; U.S. Pat. No. 5,235,720 and U.S. Pat. No. 5,255,407.

While these devices fulfill their respective, particular objectives and requirements, the aforementioned patents do not disclose a new weindshield wiper blade assembly with sponge and tension mechanism. The inventive device includes a wiper blade support assembly having a plurality of wiper fluid spray holes and is attached to the oscillating wiper arm of a vehicle. A first wiper blade and a second wiper blade are spaced apart from one another and downwardly depend from the wiper blade support assembly. A scrubbing sponge having a scrubbing surface and a plurality of wiper fluid channels is interposed between the first wiper blade and the second wiper blade. A plurality of wiper fluid hoses in fluid communication with the wiper fluid channels and the wiper fluid spray holes allows wiper fluid to be dispensed to the scrubbing sponge and the windshield. A sponge tension mechanism is mounted to the wiper blade support assembly and applies pressure to the scrubbing sponge to firmly position the scrubbing sponge against the windshield.

In these respects, the windshield wiper blade assembly with sponge and tension mechanism according to the present invention substantially departs from the conventional concepts and designs of the prior art, and in so doing provides an apparatus primarily developed for the purpose of removing stubborn insect deposits and other debris from the exterior of a front windshield of a vehicle.

SUMMARY OF THE INVENTION

In view of the foregoing disadvantages inherent in the known types of windshield wiper blade systems now present in the prior art, the present invention provides a new windshield wiper blade assembly with sponge and tension mechanism construction wherein the same can be utilized for removing stubborn insect deposits and other debris from the exterior of a front windshield of a vehicle.

The general purpose of the present invention, which will be described subsequently in greater detail, is to provide a new windshield wiper blade assembly with sponge and tension mechanism, apparatus and method which has many of the advantages of the windshield wiper blade systems mentioned heretofore and many novel features that result in a new windshield wiper blade assembly with sponge and tension mechanism which is not anticipated rendered obvious, suggested, or even implied by any of the prior art windshield wiper blade systems, either alone or in any combination thereof.

To attain this, the present invention generally comprises a wiper blade support assembly having a plurality of wiper fluid spray holes and is attached to the oscillating wiper arm of a vehicle. A first wiper blade and a second wiper blade are spaced apart from one another and downwardly depend from the wiper blade support assembly. A scrubbing sponge having a scrubbing surface and a plurality of wiper fluid channels is interposed between the first wiper blade and the second wiper blade. A plurality of wiper fluid hoses in fluid communication with the wiper fluid channels and the wiper fluid spray holes allows wiper fluid to be dispensed to the scrubbing sponge and the windshield. A sponge tension mechanism is mounted to the wiper blade support assembly and applies pressure to the scrubbing sponge to firmly position the scrubbing sponge against the windshield.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

It is therefore an object of the present invention to provide a new windshield wiper blade assembly with sponge and tension mechanism apparatus and method which has many of the advantages of the windshield wiper blade systems mentioned heretofore and many novel features that result in a new windshield wiper blade assembly sponge and tension mechanism which is not anticipated, rendered obvious suggested or even implied by any of the prior art windshield wiper blade systems, either alone or in any combination thereof.

It is another object of the present invention to provide a new windshield wiper blade assembly with sponge and tension mechanism which may be easily and efficiently manufactured and marketed.

It is a further object of the present invention to provide a new windshield wiper blade assembly with sponge and tension mechanism which is of a durable and reliable construction.

An even further object of the present invention is to provide a new windshield wiper blade assembly with sponge and tension mechanism which is susceptible of a low cost of manufacture with regard to both materials and labor, and which accordingly is then susceptible of low prices of sale to the consuming public, thereby making such windshield wiper blade assembly with sponge and tension mechanism economically available to the buying public.

Still yet another object of the present invention is to provide a new windshield wiper blade assembly with sponge and tension mechanism which provides in the apparatuses and methods of the prior art some of the advantages thereof, while simultaneously overcoming some of the disadvantages normally associated therewith.

Still another object of the present invention is to provide a new windshield wiper blade assembly with sponge and tension mechanism for removing stubborn insect deposits and other debris from the exterior of a front windshield of a vehicle.

Yet another object of the present invention is to provide a new windshield wiper blade assembly with sponge and tension mechanism which includes a wiper blade support assembly having a plurality of wiper fluid spray holes and is attached to the oscillating wiper arm of a vehicle. A first wiper blade and a second wiper blade are spaced apart from one another and downwardly depend from the wiper blade support assembly. A scrubbing sponge having a scrubbing surface and a plurality of wiper fluid channels is interposed between the first wiper blade and the second wiper blade. A plurality of wiper fluid hoses in fluid communication with the wiper fluid channels and the wiper fluid spray holes allows wiper fluid to be dispensed to the scrubbing sponge and the windshield. A sponge tension mechanism is mounted to the wiper blade support assembly and applies pressure to the scrubbing sponge to firmly position the scrubbing sponge against the windshield.

Still yet another object of the present invention is to provide a new windshield wiper blade assembly with sponge and tension mechanism that prevents obstruction of a driver's visibility through a windshield while driving a vehicle.

Even still another object of the present invention is to provide a new windshield wiper blade assembly with sponge and tension mechanism that allows disbursement of wiper fluid through the scrubbing sponge to keep the sponge free from clogging debris.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the invention.

FIG. 4 is a cross sectional view taken along line 4—4 of FIG. 2 showing the sponge tension mechanism.

DESCRIPTION OF THE PREFERRED EMBODIMENT

Figure 1:
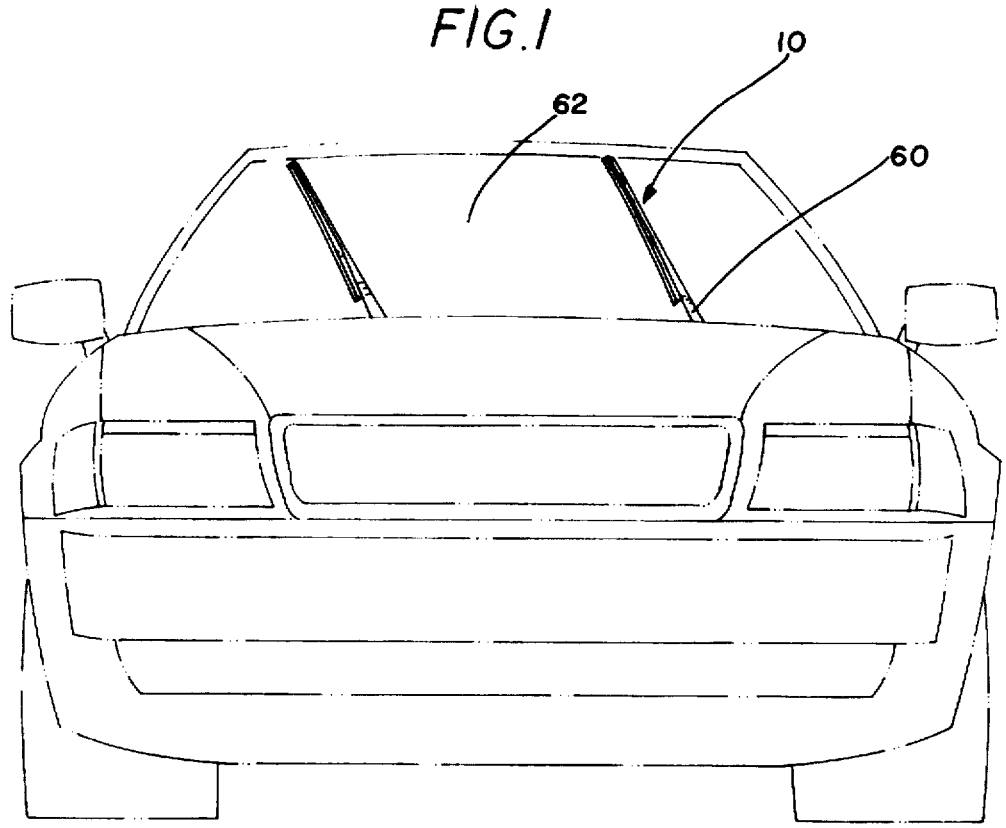
FIG. 1 is a front side perspective view of a new windshield wiper blade assembly with sponge and tension mechanism on a windshield according to the present invention.
Figure 3:
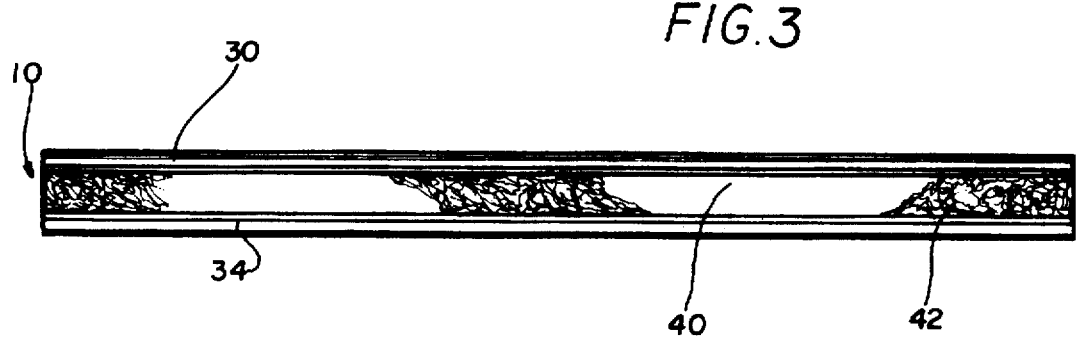
FIG. 3 is a bottom view of the invention from the perspective of line 3—3 of FIG. 2 showing the wiper blades and the scrubbing sponge.
Figure 5:
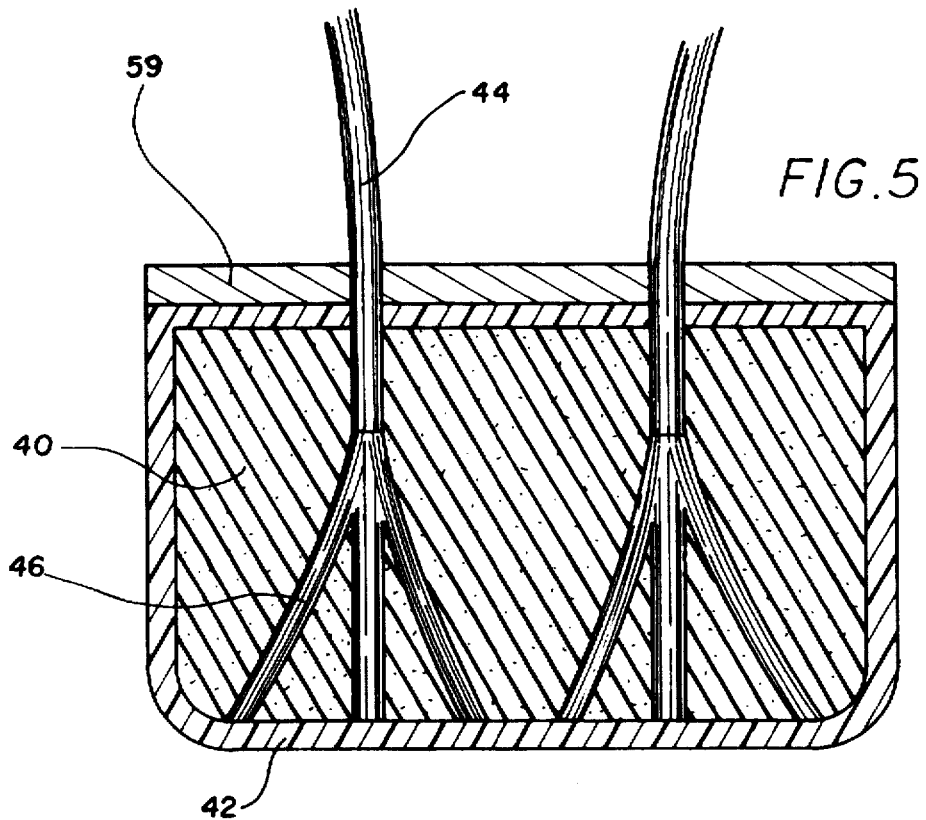
FIG. 5 is a partial cross sectional view taken along line 5—5 of FIG. 2 showing only the scrubbing sponge and its wiper fluid channels.
Figure 6:
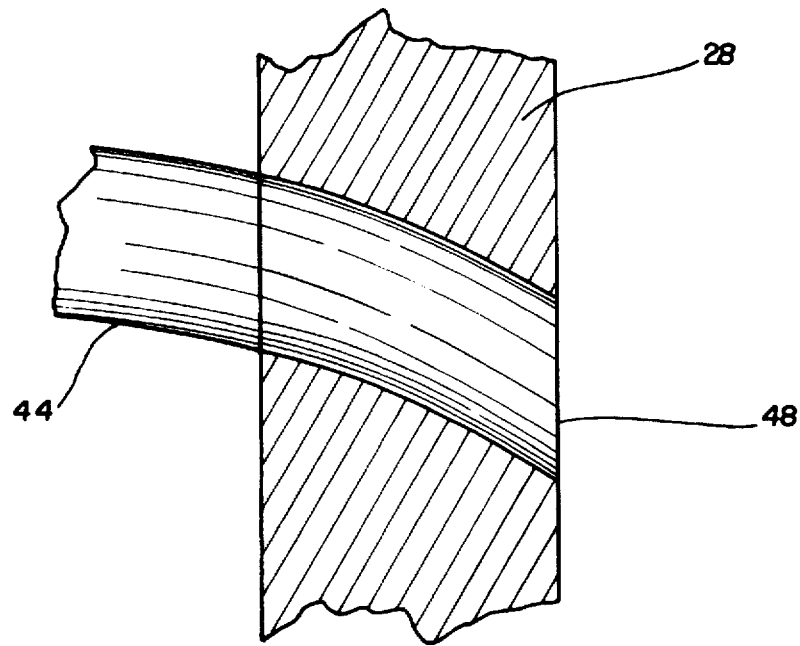
FIG. 6 is a partial cross sectional view taken along line 6—6 of FIG. 2 showing only a wiper fluid spray hole in the support arm.

With reference now to the drawings, and in particular to FIGS. 1 through 6 thereof, a new windshield wiper blade assembly with sponge and tension mechanism embodying the principles and concepts of the present invention and generally designated by the reference numeral 10 will be described.

More specifically, it will be noted that the windshield wiper blade assembly with sponge and tension mechanism 10 comprises a wiper blade support assembly 20, a first wiper blade 30, a second wiper blade 34, a scrubbing sponge 40, and a sponge tension mechanism 50.

As best illustrated in FIGS. 1 through 6, it can be shown that the windshield wiper blade assembly with sponge and tension mechanism 10 is designed to remove bugs and debris from the windshield 62 of vehicles having at least one oscillating wiper arm 60 having at least one carrier arm 64 with a plurality of slotted carrier clips 66.

The windshield wiper blade assembly with sponge and tension mechanism 10 is built around the wiper blade support assembly 20. The wiper blade support assembly 20 has a support base portion 22 which acts as an elongated spine member for the invention. A first wiper blade support arm 26 and the second wiper blade support arm 28 downwardly depend from the support base arm 22. The first wiper blade support arm 26 and the second wiper blade support arm 28 are spaced apart from each other to allow space for the width of the scrubbing sponge 40 and for the sponge tension mechanism 50. The first wiper blade support arm 26 includes a first wiper blade accepting groove 27 at its lower end. likewise, the second wiper blade support arm 28 includes a second wiper blade accepting groove 29 at its lower end.

The first wiper blade 30 has a first wiper blade flange 31 and a first wiper blade tip 32. The first wiper blade flange 31 is disposed in the first wiper blade accepting groove 24 attaching the first wiper blade 30 to the first wiper blade support arm 22. The first wiper blade 30 is attached to the first wiper blade support arm 22 so that the first wiper blade tip 32 downwardly depends from the first wiper blade support arm 22.

The second wiper blade 34 has a second wiper blade flange 35 and a second wiper blade tip 36. The second wiper blade flange 35 is disposed in the second wiper blade accepting groove 29 attaching the second wiper blade 34 to the second wiper blade support arm 28. The second wiper blade 34 is attached to the second wiper blade support arm 28 so that the second wiper blade tip 36 downwardly depends from the second wiper blade support arm 28. The second wiper blade 34 and the first wiper blade 30 are spaced apart from one another on the wiper blade support assembly 20 to allow between them space for the scrubbing sponge 40 and the sponge tension mechanism 50. The second wiper blade 34 and the first wiper blade 30 are made of any rubber like material suitable for making typical windshield wiper blades and should be able to remove water from a windshield 62.

The scrubbing sponge 40 has a scrubbing surface 42 around it that is made of a material having a sufficient abrasiveness to remove insects tree sap and other debris on a windshield 62 while not scratching the windshield 62. A suitable material is made by the 3-M Company of Minnesota under the product name Scotch Brite. The scrubbing sponge 40 is interposed in the space between the first wiper blade 30 and the second wiper blade 34 so that the bottom side of the scrubbing sponge 40 is in the plane as to the ends of the first wiper blade tip 32 and the second wiper blade tip 36. The scrubbing sponge 40 includes a plurality of wiper fluid channels 46 dispersed within its interior. A plurality of wiper fluid hoses 44 connected to the wiper fluid reservoir system of the vehicle are attached to the scrubbing sponge 40 and are in fluid communication with the wiper fluid channels 46 allowing a user to dispense wiper fluid to the scrubbing sponge 40.

A sponge tension mechanism 50 is disposed in the space between the first wiper blade 30 and the second wiper blade 34 and positioned between the wiper blade support assembly 20 and the scrubbing sponge 40. The sponge tension mechanism 50 comprises a threaded tension adjusting knob 52 which is threaded, an tipper spring housing 56 having a threaded upper spring end 57, a lower spring housing 58, a tension spring 54, and a scrubbing sponge pressure plate 59. The upper spring housing is mounted to the support base portion 22 of the wiper blade support assembly 20 with the lower spring housing 58 is slidably mounted to the upper spring housing. The tension spring 54 is disposed within the upper spring housing 56 and the lower spring housing 58 combination. The upper face of the scrubbing sponge pressure plate 59 is attached to the lower spring housing 58 while the lower face of the scrubbing sponge pressure plate 59 is removably attached to the scrubbing sponge 40.

The threaded tension adjusting knob 52 is threadably mounted on the threaded upper spring end 57 of the upper spring housing 56. This allows the sponge tension mechanism 50 to provide pressure to the scrubbing sponge 40 when it is against the windshield 62 so that the scrubbing surface 42 may remove debris on the windshield 62. When the tension adjusting knob 52 is rotated on to the threaded upper sponge end 57 of the upper spring housing 56 the tension spring 54 is compressed. The deeper the tension adjusting knob 52 is threaded on to the upper spring housing 56 the more the tension spring 54 is compressed. This causes the tension spring 54 to apply pressure against the scrubbing sponge pressure plate 59 which thereby applies pressure to the scrubbing sponge 40. This allows the scrubbing sponge 40 to be firmly positioned against the windshield 62.

The support base portion 22 also includes a plurality of carrier clip mounting grooves 24 which attach the Windshield Wiper Blade Assembly 10 to the slotted clips 66 on the carrier arms 64 of the oscillating wiper arm 60. The slotted carrier clips 66 hold the windshield wiper blade assembly with sponge and tension mechanism 10 against the windshield 62.

The support (arm 28), may also include a plurality of wiper fluid spray holes 48. The wiper fluid hoses 44 are also connected to the wiper fluid spray holes 48 allowing a user to dispense wiper fluid to the windshield 62.

In use the windshield wiper blade assembly with sponge and tension mechanism 10 is moved back and forth across the windshield 62 by the oscillating wiper arm 60. The scrubbing surface 42 against the windshield 62 removes insects and other stubborn deposits and debris on the windshield 62 while the first and second wiper blades 30,34 remove water from the windshield 62 when moving across it. The compression of the tension spring 54 in the sponge tension mechanism 50 presses the scrubbing sponge 40 against the windshield 62. The threaded tension adjusting knob 52 adjusts the pressure applied to the scrubbing sponge 40 by rotating the threaded tension adjusting knob down into the upper spring housing 58. The pressure should be adjusted so that the scrubbing sponge 40 is held against the windshield 62 but light enough so that the first wiper blade 30 and second wiper blade 34 are not forced off the windshield 62.

If washer fluid needs to be dispensed, it is provided by the wiper fluid hoses 44 which connects the vehicles wiper fluid delivery system to the wiper fluid spray holes 48 which spray wiper fluid directly to the windshield 62 and to the wiper fluid channels 46 so that debris on the scrubbing sponge 40 is flushed away.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A windshield wiper blade assembly with sponge and tension mechanism for wiping and cleaning a windshield of a vehicle having a oscillating wiper arm adapted for holding the windshield wiper blade assembly with sponge and tension mechanism against the windshield, said windshield wiper blade assembly with sponge and tension mechanism comprising:

a wiper blade support assembly having a support base portion, a first wiper blade support arm, and a second wiper blade support arm, said support, portion being adapted to be mounted on the oscillating wiper arm, said first wiper blade support arm and said second wiper blade support arm being spaced apart and being downwardly depending from said support base portion;

a first wiper blade being coupled to said first wiper blade support arm and being downwardly depending from said first wiper blade support arm;

a second wiper blade being coupled to said second wiper blade support arm and being downwardly depending from said second wiper blade support arm, said first wiper blade being spaced apart from said second wiper blade;

a scrubbing sponge having a scrubbing surface and being interposed between said first wiper blade and said second wiper blade, said scrubbing sponge being in contact with said first wiper blade and said second wiper blade; and a sponge tension mechanism being mounted on said wiper blade support assembly, said sponge tension mechanism being coupled to said scrubbing sponge, said sponge tension mechanism applying pressure to said scrubbing sponge whereby said scrubbing sponge is firmly positioned against said windshield to remove debris from said windshield.

2. The windshield wiper blade assembly with sponge and tension mechanism of claim 1, further comprising a plurality of wiper fluid hoses, wherein said wiper blade support assembly has a plurality of wiper fluid spray holes, wherein said scrubbing sponge has a plurality of wiper fluid channels, said wiper fluid hoses being in fluid communication with said wiper fluid channels and said wiper fluid spray holes whereby wiper fluid may be dispensed to said scrubbing sponge and said windshield from said wiper fluid hoses.

3. The windshield wiper blade assembly with sponge and tension mechanism of claim 1, wherein said sponge tension mechanism comprises a threaded tension adjusting knob, an upper spring housing, a lower spring housing, a tension spring, and a scrubbing sponge pressure plate, said upper spring housing being mounted on said wiper blade support assembly, said lower spring housing being slidably mounted on said upper spring housing, said tension spring being disposed within said upper spring housing and said lower spring housing, said scrubbing sponge pressure plate being coupled to said lower spring housing, said threaded tension adjusting knob being threadably mounted to said upper spring housing whereby said tension spring is compressed by the rotation of said adjustment knob, said tension spring thereby applying pressure to said scrubbing sponge pressure plate, said scrubbing sponge pressure plate being removably attached to said scrubbing sponge, said sponge tension mechanism thereby applying pressure to said scrubbing sponge from said scrubbing sponge pressure plate whereby said scrubbing sponge is firmly positioned against said windshield to remove debris from said windshield.

4. The windshield wiper blade assembly with sponge and tension mechanism of claim 1, wherein said wiper blade support assembly has a plurality of carrier clip mounting grooves, wherein said first wiper blade support arm has a first wiper blade accepting groove, wherein said second wiper blade support arm has a second wiper blade accepting groove, wherein said first wiper blade has a first wiper blade flange and a first wiper blade tip, said first wiper blade flange being fixedly disposed in said first wiper blade accepting groove, and said first wiper blade tip being downwardly depending from said first wiper blade support arm, wherein said second wiper blade has a second wiper blade flange and a second wiper blade tip, said second wiper blade flange being fixedly disposed in said second wiper blade accepting groove, and said second wiper blade tip being downwardly depending from said second wiper blade support arm.

5. The windshield wiper blade assembly with sponge and tension mechanism of claim 1, wherein said wiper blade support assembly has a plurality of carrier clip mounting grooves, wherein said first wiper blade support arm has a first wiper blade accepting groove, wherein said second wiper blade support arm has a second wiper blade accepting groove, wherein said first wiper blade has a first wiper blade flange and a first wiper blade tip, said first wiper blade flange being fixedly disposed in said first wiper blade accepting groove, and said first wiper blade tip being downwardly depending from said first wiper blade support arm, wherein said second wiper blade has a second wiper blade flange and a second wiper blade tip, said second wiper blade flange being fixedly disposed in said second wiper blade accepting groove, and said second wiper blade tip being downwardly depending from said second wiper blade support arm.

6. A windshield wiper blade assembly with sponge and tension mechanism for wiping and cleaning a windshield of a vehicle having a oscillating wiper arm having at least one carrier arm and a plurality of slotted carrier clips for holding the windshield wiperblade assembly with sponge and tension mechanism against the windshield, said windshield wiper blade assembly with sponge and tension mechanism comprising:

a wiper blade support assembly having a support base portion, a first wiper blade support arm, a second wiper blade support arm, a plurality of carrier clip mounting grooves, and a plurality of wiper fluid spray holes, said carrier clip mounting grooves receiving the slotted carrier clips said first wiper blade support arm and said second wiper blade support arm being spaced apart and being downwardly depending from said support base portion, said first wiper blade support arm having a first wiper blade accepting groove, and said second wiper blade support arm having a second wiper blade accepting groove;

a first wiper blade having a first wiper blade flange and a first wiper blade tip, said first wiper blade flange being fixedly disposed in said first wiper blade accepting groove, and said first wiper blade tip being downwardly depending from said first wiper blade support arm;

a second wiper blade having a second wiper blade flange and a second wiper blade tip, said second wiper blade flange being fixedly disposed in said second wiper blade accepting groove, and said second wiper blade tip being downwardly depending from said second wiper blade support arm, said first wiper blade being spaced apart from said second wiper blade;

a scrubbing sponge having a scrubbing surface and a plurality of wiper fluid channels, said scrubbing spongy being interposed between said a first wiper blade and said second wiper blade;

a plurality of wiper fluid hoses being in fluid communication with said wiper fluid channels and said wiper fluid spray holes whereby wiper fluid may be dispensed to said scrubbing sponge and said windshield from said wiper fluid hoses; and a sponge tension mechanism having a threaded tension adjusting knob, an upper spring housing, a lower spring housing, a tension spring, and a scrubbing sponge pressure plate, said upper spring housing being mounted on said wiper blade support assembly, said lower spring housing being slidably mounted on said upper spring housing, said tension spring being disposed within said upper spring housing and said lower spring housing, said scrubbing sponge pressure plate being coupled to said lower spring housing, said threaded tension adjusting knob being threadably mounted to said upper spring housing whereby said tension spring is compressed by the rotation of said adjustment knob, said tension spring thereby applying pressure to said scrubbing sponge pressure plate, said scrubbing sponge pressure plate being removably attached to said scrubbing sponge, said sponge tension mechanism thereby applying pressure to said scrubbing sponge from said scrubbing sponge pressure plate whereby said scrubbing sponge is firmly positioned against said windshield to remove debris from said windshield.

7. A windshield wiper blade assembly with sponge and tension mechanism for wiping and cleaning a windshield of a vehicle having a oscillating wiper arm adapted for holding the windshield wiper blade assembly with sponge and tension mechanism against the windshield, said windshield wiper blade assembly with sponge and tension mechanism comprising:

- a wiper blade support assembly having a support base portion, a first wiper blade support arm, and a second wiper blade support arm, said support base portion being adapted to be mounted on the oscillating wiper arm, said first wiper blade support arm and said second wiper blade support arm being spaced apart and being downwardly depending from said support base portion;
- a first wiper blade being coupled to said first wiper blade support arm and being downwardly depending from said first wiper blade support arm;
- a second wiper blade being coupled to said second wiper blade support arm and being downwardly depending from said second wiper blade support arm, said first wiper blade being spaced apart from said second wiper blade;
- a scrubbing sponge having a scrubbing surface and being interposed between said first wiper blade and said second wiper blade, said scrubbing sponge being in contact with said first wiper blade and said second wiper blade;
- a sponge tension mechanism being mounted on said wiper blade support assembly, said sponge tension mechanism being coupled to said scrubbing sponge, said sponge tension mechanism applying pressure to said scrubbing sponge whereby said scrubbing sponge is firmly positioned against said windshield to remove debris from said windshield; and
- a plurality of wiper fluid hoses, wherein said wiper blade support assembly has a plurality of wiper fluid spray holes, wherein said scrubbing sponge has a plurality of wiper fluid channels, said wiper fluid hoses being in fluid communication with said wiper fluid channels and said wiper fluid spray holes whereby wiper fluid may be dispensed to said scrubbing sponge and said windshield from said wiper fluid hoses.

8. The windshield wiper blade assembly with sponge and tension mechanism of claim 7, wherein said sponge tension mechanism comprises a threaded tension adjusting knob, an upper spring housing, a lower spring housing, a tension spring, and a scrubbing sponge pressure plate, said upper spring housing being mounted on said wiper blade support assembly, said lower spring housing being slidably mounted on said upper spring housing, said tension spring being disposed within said upper spring housing and said lower spring housing, said scrubbing sponge pressure plate being coupled to said lower spring housing, said threaded tension adjusting knob being threadably mounted to said upper spring housing whereby said tension spring is compressed by the rotation of said adjustment knob, said tension spring thereby applying pressure to said scrubbing sponge pressure plate, said scrubbing sponge pressure plate being removably attached to said scrubbing sponge, said sponge tension mechanism thereby applying pressure to said scrubbing sponge from said scrubbing sponge pressure plate whereby said scrubbing sponge is firmly positioned against said windshield to remove debris from said windshield.

* * * * *